Patented Feb. 22, 1927.

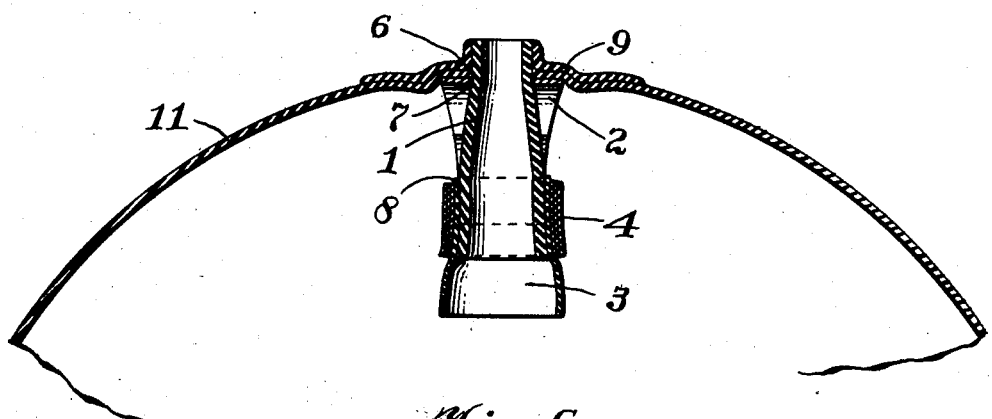
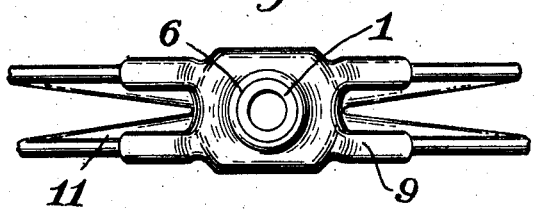
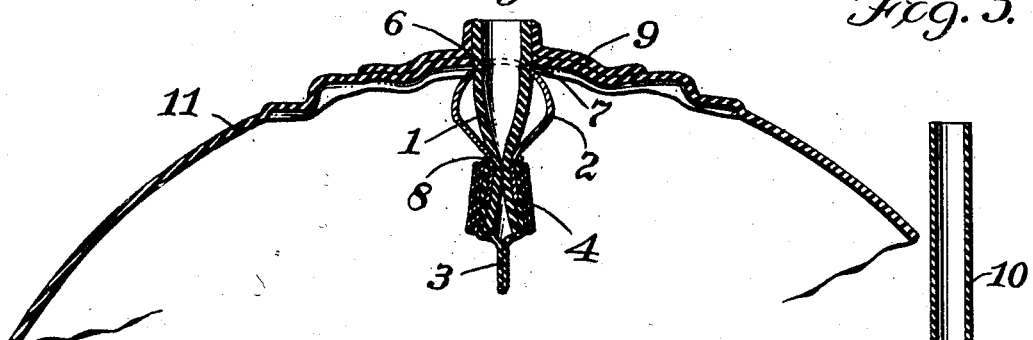
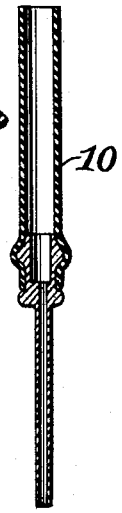
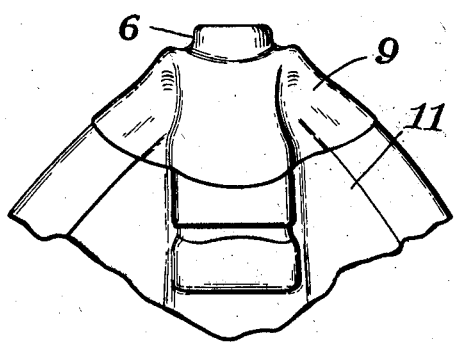

1,618,676

UNITED STATES PATENT OFFICE.

MILTON B. REACH, OF SPRINGFIELD, AND WILLIAM W. MacDONALD, OF CHICOPEE, MASSACHUSETTS, ASSIGNORS TO A. G. SPALDING & BROS., OF NEW YORK, N. Y., A CORPORATION OF NEW JERSEY.

VALVE FOR SPORT BALLS OR FLUID CONTAINERS.

Application filed May 25, 1926. Serial No. 111,614.

The invention relates to a valve for inflatable sport balls.

One object is to provide a filling tube with a simple form of means for closing the same.

Another object of the invention is to provide a valve of the flutter type, the action of which is supplemented by the action of a spring which causes an air tight constriction in the tube to which the flutter valve is connected.

Other objects will be clear from the following.

The invention consists in the features and combination and arrangement of parts hereinafter described and particularly pointed out in the claims.

In the drawings:

Figure 1 is a sectional view of the valve connected to the bladder.

Fig. 2 is a sectional view of the valve turned 90° from Fig. 1.

Fig. 3 shows the metal filling or deflating tube having a larger rubber tube applied thereto.

Figs. 4, 5 and 6 are detail views.

Referring more particularly to the drawings, the valve unit comprising the pre-cured rubber tube 1, the substantially U-shaped spring 2, the flutter valve 3 and wrapping band 4 is first assembled, and then the tube 1 is applied to the aperture 5 in the rubber bladder 6 and vulcanized thereto.

The tube 1 is first cured, then the U-shaped spring 2 is applied to the tube with its jaws clamping the tube and forming a constriction therein and with the tube passing through the opening 7 in the loop or curved portion of the spring. The flutter valve 3 having an upwardly extending sleeve portion 8 is then applied with the sleeve portion extending around the ends of the spring and tube and cemented thereto. A wrapping band 4 is wrapped around the sleeve 8 of the flutter valve and holds the spring in place on the tube. The whole valve unit is then cured.

The complete valve unit as thus made up is fitted within the uncured bladder 11 with the tube 1 projecting through the opening 6 and slightly above the wall of the bladder. A flanged washer or outside patch 9 is cemented to the bladder and surrounds the end of the tube 1. The flanged washer 9 is then cured in place so that it is vulcanized to the tube and also to the bladder. The washer member or outside patch 9 serves to protect the valve unit from being affected by the heat of vulcanization.

In inflating and deflating the bladder a metal tube such as shown in Fig. 3 is used to convey the air in its ingress or egress.

This metal tube is forced through the tube 1 to open the constriction and allow the air to pass in or out of the bladder as the case may be. The metal tube or inflating instrument is provided with a rubber hose connection 10 to facilitate the inflation of the bladder. For inflation of the bladder it is not necessary to use the inflating instrument to force the spring apart, as the pressure of air will do this sufficiently to open the constriction and admit the air. It is desirable, however, to use the metal tube to deflate the bladder.

The flutter type of valve ordinarily gives rise to difficulty due to ageing of the rubber. However, a double valve effect is provided by this improvement. If the flutter valve fails to work, the spring will act as an efficient valve by constricting the tube 1 to prevent egress of air.

In the present invention there is no uniting of rubber tube and metal by vulcanization, the rubber tube 1 having merely a slip fit in the metal clip, but the wrapping holds the tube and spring clip in position relative to each other.

We do not limit ourselves to the means herein described for attaching the valve unit to the bladder.

We claim:

1. In combination with a sport ball bladder, a filling tube extending inwardly from the wall of said bladder and a bow shaped spring on the tube having its arms pressing the sides of the tube together to form a closure, said spring yielding under pressure exerted from within the tube for the passage of air, substantially as described.

2. In combination with a sport ball bladder, a filling tube extending inwardly from the wall of the bladder and a bow shaped flat spring having an opening through which the tube extends and having arms extending lengthwise of the tube towards its free end for compressing the said tube to form a closure.

3. In combination with a bladder for sport balls, a filling tube extending inwardly from the filling aperture of the bladder, a substantially U-shaped spring engaging said tube and forming a constriction therein, said spring having an opening in its curved portion through which the tube passes, above the point where it is constricted, and a flutter valve connected to said tube and disposed below the constriction.

4. In a valve for inflatable sport balls, a tube extending inwardly from the filling aperture of the bladder of the ball, a substantially U-shaped spring with its arms symmetrically disposed on opposite sides of said tube and aligned therewith, said spring having an opening in its curved or bowed portion to receive the tube, said tube extending downwardly between the jaws of the spring, whereby a constriction is formed in the tube, and a flutter valve connected to said tube below the constriction.

5. In combination with a sport ball bladder, a filling tube extending inwardly from the filling aperture of the bladder and fastened to the body thereof at the aperture, a spring constricting said tube, and a flutter valve connected with said tube and disposed below the constriction, said flutter valve having an upwardly extending sleeve portion within which the ends of the spring between which the tube passes are located and secured by cementation or the like, and a rubber band wrapped about the sleeve portion of the valve to further secure it to the ends of the spring and tube and to hold the spring in place on the tube.

6. In a valve for inflatable sport balls, a prevulcanized tube extending inwardly of the bladder of the ball and vulcanized to the ball at the filling aperture, a spring clamping said tube to form a constriction therein, a flutter valve vulcanized to the end of the tube and the arms of the spring and a rubber band secured about the flutter valve member where it joins the ends of the tube and spring to hold the spring in place.

7. In combination with a sport ball bladder, a filling tube extending inwardly from the wall of the bladder and a bow-shaped flat spring having an opening through which the tube extends and having arms extending lengthwise of the tube towards its free end for compressing the said tube to form a closure, and means attached to the free end of the tube for holding the said arms of the spring aligned with the tube.

In testimony whereof we affix our signatures.

MILTON B. REACH.
WILLIAM W. MacDONALD.